United States Patent [19]

Pickett et al.

[11] Patent Number: 4,682,053
[45] Date of Patent: Jul. 21, 1987

[54] METHOD AND MEANS FOR GENERATION OF TUNABLE LASER SIDEBANDS IN THE FAR-INFRARED REGION

[75] Inventors: Herbert M. Pickett, La Canada; Jam Farhoomand, Pasadena, both of Calif.

[73] Assignee: The United States of America as represented by the Administrator of the National Aeronautics and Space Administration, Washington, D.C.

[21] Appl. No.: 783,887

[22] Filed: Oct. 3, 1985

[51] Int. Cl.[4] .................... G02F 2/00; H01S 3/00
[52] U.S. Cl. .......................... 307/425; 372/4; 372/20; 372/69; 372/99
[58] Field of Search .............. 307/425; 372/20, 4, 372/99, 69

[56] References Cited

U.S. PATENT DOCUMENTS

| | | | |
|---|---|---|---|
| 3,420,600 | 1/1969 | Mevers et al. | 350/157 |
| 3,855,544 | 12/1974 | Bowness | 331/945 |
| 4,176,326 | 11/1979 | Wittig et al. | 372/4 |
| 4,330,761 | 5/1982 | Cohn et al. | 372/4 |
| 4,464,759 | 8/1984 | Haus et al. | 372/18 |

FOREIGN PATENT DOCUMENTS 2029702 10/1977 Fed. Rep. of Germany ........ 372/38

Primary Examiner—James W. Davie
Attorney, Agent, or Firm—Paul F. McCaul; John R. Manning; Thomas H. Jones

[57] ABSTRACT

A method is described for generating tunable far-infrared radiation. The apparatus includes a Schottky-barrier diode which has one side coupled through a conductor to a waveguide that carries a tunable microwave frequency, the diode having an opposite side which is coupled through a radiating whisker to a bias source. Infrared light is directed at the diode, and infrared light with tunable sidebands is radiated by the whisker through an open space to a reflector. The original infrared is separated from a tunable infrared sideband by a polarizing Michelson interferometer.

7 Claims, 2 Drawing Figures

– 4,682,053 –

METHOD AND MEANS FOR GENERATION OF TUNABLE LASER SIDEBANDS IN THE FAR-INFRARED REGION

ORIGIN OF INVENTION

The invention described herein was made in the performance of work under a NASA contract, and is subject to the provisions of Public Law 96-517 (35 USC 202) in which the Contractor has elected not to retain title.

BACKGROUND OF THE INVENTION

Until recently, there has been an almost complete lack of sources for far-infrared light that was coherent and tunable. The sources that have heretofore been developed have produced extremely low power levels of such tunable coherent far-infrared light. A method for producing such light would have considerable uses.

SUMMARY OF THE INVENTION

In accordance with one embodiment of the present invention, a method and apparatus is provided for generating an appreciable amount of tunable electromagnetic radiation of a far-infrared wavelength. Coherent far-infrared radiation, such as from a laser, is combined with continuously tunable microwave radiation to produce far-infrared radiation of the original laser frequency and at least a first sideband frequency which equals the laser frequency plus or minus the tunable microwave frequency. The initial laser frequency is separated from the sideband frequency, so light which includes a high proportion of the sideband frequency is produced.

A means for separating the initial laser frequency from the sideband frequency includes a polarizing Michelson interferometer which includes a pair of rooftop reflectors and a polarizer. The rooftop reflectors are located at different distances from the polarizer, the difference being equal to an integral number of wavelengths of one of the components (the original infrared frequency or the sideband), and also equal to one-half wavelength plus an integral number of wavelengths of the other component. This results in different polarization between the original laser frequency and the sideband, to permit reflection of one and passage of the other through a second polarizer.

The means for mixing the original far-infrared light as from a laser, with the tunable microwave energy includes a diode lying in an open area, with one side coupled to a waveguide carrying the tunable microwave frequency and another side coupled to a whisker that can radiate. A reflector that directs the original laser light at the diode, also receives the mixture of the laser frequency with the tunable sideband frequency.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
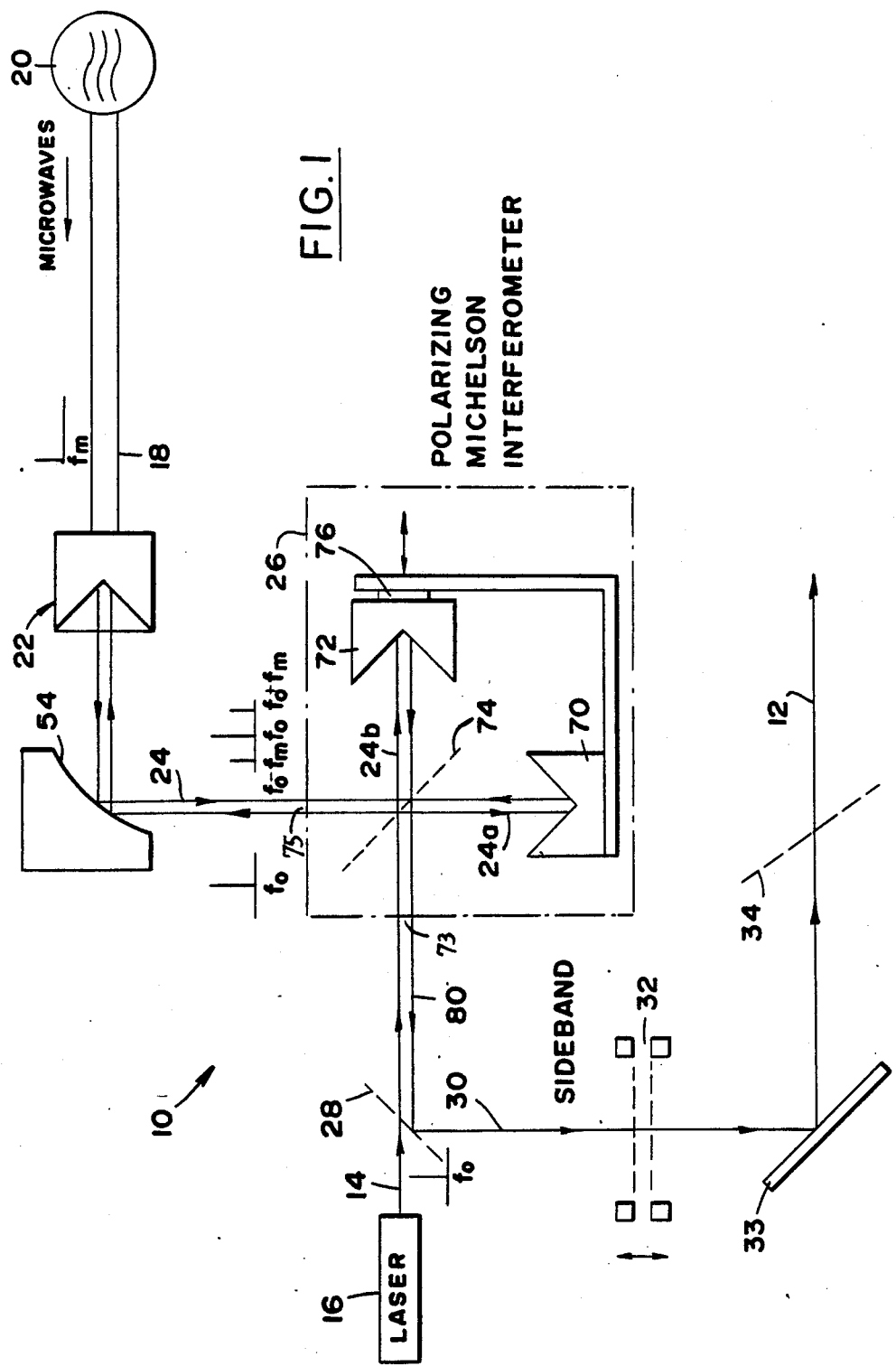
FIG. 1 is a diagram showing a system for generating tunable far-infrared radiation.

FIG. 1 illustrates a system 10 with an output 12 which delivers far-infrared electromagnetic radiation, or light, which can be continuously tuned within a limited range. The system includes a first input 14 which receives coherent infrared radiation from a source 16 such as a $CO_2$ laser. The system has a second input 18 which receives microwave radiation from a tunable source 20, such as a millimeter-wave phase-locked klystron, which can be tuned over a limited range. The system includes a mixer 22 which receives light of a first or original far-infrared frequency $f_o$ produced by the source 16, and mixes it with the tunable microwaves of a frequency $f_m$. The result is the production of light of three frequencies, including light of the original frequency $f_o$, light of a first sideband frequency $f_o+f_m$, and light of another sideband frequency $f_o-f_m$. This mixture, shown at 24, enters a polarizing Michelson interferometer 26. The interferometer 26 polarizes one of the components of the mixed frequencies, such as of the original frequency $f_o$, by 90°, and polarizes another component such as a selected one of the sidebands such as $f_o+f_m$, by 0°.

The two differently polarized components, of frequencies $f_o$ and $f_o+f_m$, encounter a polarizer 28, oriented at 45° to the direction of incoming light, which passes the 90° polarized component of frequency $f_o$, and reflects the 0° polarized component $f_o+f_m$. Light on an output 30 can then be used, although it will still contain an appreciable level of the original frequency $f_o$. This original frequency $f_o$ is further reduced by passing it through a scanning Fabry-Perot filter 32 and reflecting it by reflector 33 to an angle tunable mesh filter 34, to produce the output 12 which contains a high proportion of light of the sideband frequency $f_o+f_m$. Since the frequency component $f_m$ represents the frequency of the microwaves from the klystron 20 which is tunable, the far-infrared component in the output 12 can be tuned within the same limited frequency range as the output of the klystron 20 can be tuned.

Figure 2:
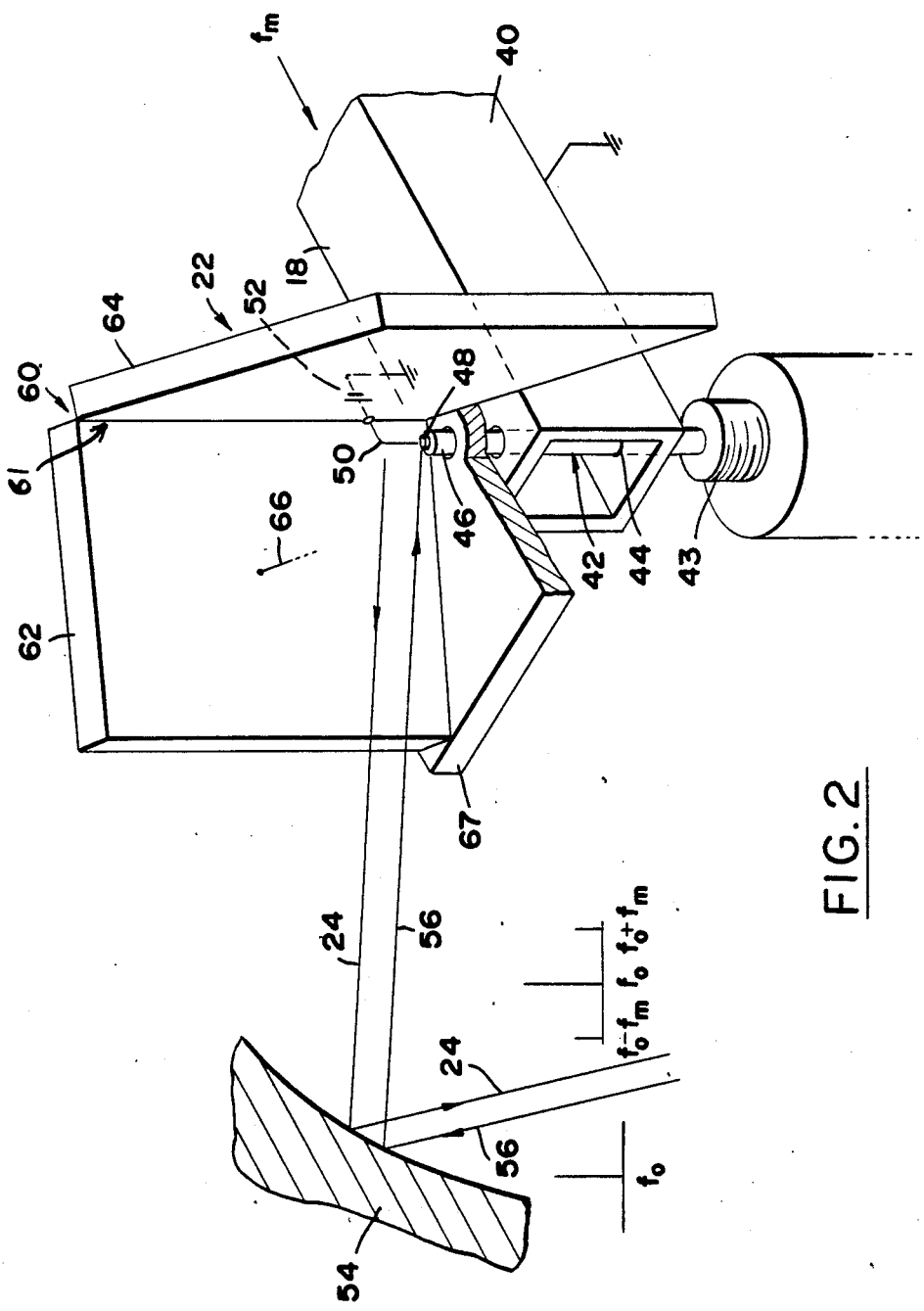
FIG. 2 is a partially sectional perspective view of the mixer device in the system of FIG. 1.

The mixer 22 is shown in greater detail in FIG. 2. Microwaves of the frequency $f_m$ enter the mixer through a waveguide 40 which forms the input 18. For microwaves of a high frequency such as 93 GHz, the waveguide 40 must have a very small cross-section for efficient transmission, such as a rectangle which is about two millimeters by three millimeters on the sides. A miniature post 42 on a micrometer screw 43 passes through the waveguide, with the bottom of the post at 44 connected to the waveguide to ground that end of the post, and with the other end portion of the post 46 being free of direct connection to the upper end of the waveguide to isolate it therefrom. As a result, current of microwave frequency is induced in the post 42.

A nonlinear photosensitive device 48 which has a fast response time, such as a Schottky-barrier diode, has one terminal connected directly to the top of the post 42 as by mounting the diode thereto. The other terminal of the diode contacts one end of a conductive whisker 50 whose other end passes through a small biasing voltage source 52 to ground. The biasing source 52 biases the diode 48 to an operating region. Light from the laser (which has passed through the interferometer) is reflected from a parabolic mirror 54 to the photosensitive diode 48. This light indicated at 56, which is of a frequency $f_o$, is sensed by the diode, and modulates the microwave frequency current passing therethrough.

The resultant current, of the frequency $f_o$ mixed with the microwave frequency $f_m$ is radiated by the whisker 50.

The whisker 50 is very thin to provide an efficient radiator for the high infrared frequencies. The region between the diode and reflector is an open structure, in that it is not confined by a waveguide of under ten millimeter (one centimeter) width. The radiated light indicated at 24, includes the original frequency $f_o$ and the two sideband frequencies including one of frequency $f_o+f_m$. This mixed frequency is here reflected back by the parabolic mirror 54 in the same direction as it received the original laser frequency. However, it is possible to reflect the received mixed frequency in a different direction so only it, and not the original laser light, passes through the interferometer, although this decreases the efficiency.

In order to increase the amount of light directed to the parabolic reflector, a concentrating roof reflector, or mixer reflector 60 is provided. The mixer reflector has a forward reflecting side 61 on a side of the whisker 50 which is opposite the parabolic reflector 54. The mixer reflector includes two plane reflectors 62, 64 that are angled at 90° from one another, that is, imaginary lines such as 66 which are normal to the surface of each reflector will intersect at 90°. The result of the mixer is the mixed light 24 which includes the original and at least one sideband frequency (normally two sideband frequencies). A ground plane 67 is also provided to isolate the region of the diode from the waveguide.

A selected sideband such as of frequency $f_o+f_m$ is separated from the original frequency $f_o$ to a large extent, by a polarizing Michelson interferometer 26 (FIG. 1). The interferometer includes two rooftop reflectors 70, 72 and a polarizer 74. The polarizer is oriented in a plane that extends between the rooftop reflectors 70, 72. A moving means 76 such as a piezoelectric transducer, attached to one of the reflectors 72 can move it a small controlled distance towards and away from the polarizer 74. The polarizer 74 transmits half of the incoming beam at 24 (which is at 0° polarization), that the transmitted half 24a is reflected off the first reflector 70 back to the polarizer. The polarizer reflects the other half of the beam at 24 toward the second reflector 72 which reflects the beam half 24b back to the polarizer. The beam halves 24a, 24b are at 90° to each other and at 45° to the plane of the polarizer, and the rooftop reflectors are spaced from the polarizer along the beam halves. The interferometer has two ports 73, 75 along lines 24 and 80 in FIG. 1 that are at 90° angles, and can receive light along either port and discharge it along the other.

The difference in the distances between each of the two reflectors 70, 72 and the polarizer 74, determines the polarization of each beam component which pases from the polarizer 74 to another polarizer 28. The difference in the distances between the polarizer 74 and the two reflectors 70, 72 is set so it equals a whole number of wavelengths of the first frequency $f_o$, but equals one-half wavelength plus a whole number of wavelengths of a particular sideband frequency such as $f_o+f_m$. As a result, the light 80 emerging from the interferometer includes one component of frequency $f_o$ which is not polarized, or in other words is polarized by 0°, and also includes another component equal to the frequency $f_o+f_m$ which is polarized at 90°. The polarizer 28 passes light of 0° polarization and reflects light of 90° polarization. The reflected light includes a large portion of light of the sideband frequency $f_o+f_m$. In this way, light of the tunable sideband frequency $f_o+f_m$ is largely separated from light of the original laser frequency $f_o$.

The polarizing Michelson interferometer 26 has heretofore been used only as a spectroscopic tool, as to measure the wavelength of light, by noting how the level of light that passes through a polarizer varies, as one of the rooftop reflectors is moved slightly to change its distance from the polarizer 74. However, applicant does not know of any use for the polarizing Michelson interferometer to separate light components of slightly different frequencies.

Applicant has generated tunable far-infrared light of various frequencies. In one test, the laser 16 was operated at 693 GHz and the klystron was operated at 93 GHz and was tunable over a range of about 50 MHz around its center frequency. The diode 48 was biased by about 50 mV of constant voltage to optimize the sideband signal. The original laser beam from the source 16 was about a 5 millowatts level, while the laser sideband radiation at 600 and 786 GHz was measured to be 3.0 microwatts. In another test, far-infrared light of a frequency of 1627 GHz produced about 2.5 microwatts of sideband power at 1532 GHz which was tunable by about 50 MHz. The diode antenna was formed by the whisker 50 which had a width of about 13 microns and a length of about 1.7 millimeters. The whisker diameter should be less than one hundred microns for efficient radiation. The two polarizers such as 28 and 74 are polyester sheets with closely spaced conductive lines (spaced about 10 microns apart), such as Model 1GP224 infrared polarizers sold by Cambridge Physical Science. Each rooftop reflector such as 70, 72 comprises two plane reflecting surfaces at 90° angles to one another.

Thus, the invention provides a means for generating far-infrared radiation which is tunable. This is accomplished by mixing a far-infrared coherent light beam with a tunable microwave frequency. The mixing can be accomplished by coupling microwaves from a waveguide to a diode lying in an open structure on which the infrared laser light is directed, with the mixed frequencies radiated by a whisker contacting an end of the diode. A selected infrared sideband which is tunable, is separated from the original laser frequency by passing the light through a polarizing Michelson interferometer.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Apparatus for generating tunable electromagnetic radiation of a far-infrared wavelength comprising:
   means for generating infrared radiation of a predetermined first frequency;
   means for generating microwave radiation of a microwave frequency, said generating means being capable of continuously varying the frequency of the microwave radiation, at least within a predetermined range;
   means for mixing said infrared and microwave radiation to generate mixed radiation containing first infrared radiation of said first infrared frequency and second infrared radiation of a second infrared frequency representing a first sideband frequency which differs from said first frequency by said microwave frequency;

means for separating radiation of said second infrared frequency from said mixed radiation;

said separating means comprising a polarizing Michelson interferometer which includes first and second rooftop reflectors and a first polarizer, all arranged so said mixed radiation encounters said first polarizer, with one part of the mixed radiation passing through said first polarizer to said first reflector and back to the first polarizer, and another part of the mixed radiation reflecting off said first polarizer to said second reflector and back to the first polarizer, said separating means also including a second polarizer positioned to receive at least a portion of the first radiation part from the first polarizer after the first radiation part reflects from the first reflector to the first polarizer, and to also receive at least a portion of the second radiation part from the first polarizer after the second radiation part has reflected from the second reflector;

said first and second reflectors located at different distances from the first polarizer, the difference in distance equal to an integral number of wavelengths of one infrared frequency of the mixed radiation and also equal to an integral number plus one-half times the wavelength of another infrared frequency of said mixed radiation, whereby to differently polarize the different infrared frequencies to allow the second polarizer to pass one infrared frequency and reflect the other.

2. The apparatus described in claim 1 wherein said mixing means comprises:

a mixer reflector having a forward reflecting side;
a waveguide which carries said microwave radiation;
a diode;
first and second conductors which contact opposite sides of said diode and are coupled to said waveguide to pass current of said microwave frequency through said diode;
means for directing light of said first frequency at said diode;
one of said conductors being thin and elongated with a thickness less than one hundred microns, and extending in front of said mixer reflector to radiate said mixed radiation.

3. Apparatus for generating tunable electromagnetic radiation of a far-infrared wavelength comprising:

means for generating infrared radiation of a predetermined first frequency;
means for generating microwave radiation of a microwave frequency, said generating means being capable of continuously varying the frequency of the microwave radiation, at least within a predetermined range;
means for mixing said infrared and microwave radiation to generate mixed radiation containing first infrared radiation of said first frequency and second infrared radiation representing a first sideband frequency which differs from said first frequency by said microwave frequency;
means for separating radiation of said second infrared frequency from said mixed radiation;
said mixing means comprises a mixer reflector having a forward reflecting side;
a waveguide which carries said microwave radiation;
a diode;
first and second conductors which contact opposite sides of said diode and are coupled to said waveguide to pass current of said microwave frequency through said diode;
means for directing radiation of said first frequency at said diode;
one of said conductors being a whisker and extending in front of said mixer reflector to radiate said mixed radiation.

4. The apparatus described in claim 3 wherein:

said waveguide has a width less than one centimeter;
said first conductor comprises a rigid post which passes through said waveguide with one post end that is furthest from the diode being in contact with a first wall of the waveguide and the post being free of contact with said waveguide between said one post end and said diode;
the region around said whisker and forward of said reflector being an open structure which is primarily free of close confinement by any waveguide of a width of about a centimeter or less.

5. The apparatus described in claim 3 wherein:

said separating means comprises a polarizing Michelson interferometer which includes a first polarizer and two rooftop reflectors, said polarizer lying in a plane which extends between said rooftop reflectors, said separating means also including a second polarizer arranged so said mixed radiation passes into said interferometer along a first direction and exits along a second direction where it meets said second polarizer;
said first and second infrared radiation are components;
the difference in distance of said rooftop reflectors from said first polarizer equals a whole number of wavelengths of one of said radiation components and a whole number plus one-half wavelength of the other of said components.

6. A method for generating tunable far-infrared radiation comprising:

mixing coherent first infrared radiation with microwave radiation of a microwave frequency which is tunable over at least a limited frequency range, to obtain a mixed radiation which includes a first component of said first radiation frequency and at least one sideband radiation component which differs from said first radiation frequency by said microwave frequency; and
separating said sideband component from the rest of said mixed frequency;
said step of separating including directing said mixed radiation into one port of a polarizing Michelson interferometer which also has a second port, and directing light which exits the second port against a second polarizer, said interferometer having two rooftop reflectors and an interferometer polarizer;
establishing the rooftop reflectors at distances from the interferometer polarizer so the difference in the distance between said interferometer polarizer and each rooftop reflector equals a whole number of wavelengths of one component and also equals one-half wavelength plus a whole number of wavelengths of the other component.

7. A method for generating tunable far-infrared radiation comprising:

mixing coherent infrared radiation of a first frequency with tunable microwave radiation, to obtain mixed radiation which includes at least a first sideband frequency which differs from said first frequency by the frequency of said microwave radiation, and separating the first sideband frequency from said mixed radiation;

said step of mixing includes contacting a first side of a light sensitive diode with a first conductor which is coupled to a waveguide which contains said tunable microwave radiation, and coupling a second side of said conductor through a whisker to said waveguide, said whisker lying in front of a concentrating reflector;

directing said coherent radiation of said first frequency at said diode, and receiving said mixed radiation from said whisker.

* * * * *